(12) United States Patent
Feroz et al.

(10) Patent No.: US 9,779,240 B2
(45) Date of Patent: Oct. 3, 2017

(54) SYSTEM AND METHOD FOR HYPERVISOR-BASED SECURITY

(71) Applicant: VMware, Inc., Palo Alto, CA (US)

(72) Inventors: Azeem Feroz, San Jose, CA (US); Rahul Mathias Madan, Sunnyvale, CA (US); Arnold Poon, San Mateo, CA (US); Aditi Vutukuri, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 251 days.

(21) Appl. No.: 14/611,006

(22) Filed: Jan. 30, 2015

(65) Prior Publication Data

US 2016/0224789 A1 Aug. 4, 2016

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |
| *G06F 9/455* | (2006.01) |
| *G06F 21/53* | (2013.01) |
| *G06F 21/57* | (2013.01) |

(52) U.S. Cl.
CPC ........ *G06F 21/566* (2013.01); *G06F 9/45558* (2013.01); *G06F 21/53* (2013.01); *G06F 21/561* (2013.01); *G06F 21/575* (2013.01); *G06F 2009/45587* (2013.01); *G06F 2221/034* (2013.01)

(58) Field of Classification Search
CPC ............. G06F 9/45533; G06F 9/45558; G06F 21/575; G06F 21/566
See application file for complete search history.

(56) References Cited

U.S. PATENT DOCUMENTS

| | | | |
|---|---|---|---|
| 2008/0082722 A1* | 4/2008 | Savagaonkar | G06F 21/57 711/6 |
| 2008/0184373 A1* | 7/2008 | Traut | G06F 9/45533 726/26 |
| 2011/0113467 A1* | 5/2011 | Agarwal | G06F 21/6281 726/1 |
| 2011/0179490 A1* | 7/2011 | Jin | G06F 21/552 726/24 |
| 2012/0054868 A1* | 3/2012 | Ramalingam | G06F 21/52 726/24 |
| 2012/0222027 A1* | 8/2012 | Tsirkin | G06F 9/45558 718/1 |
| 2015/0089497 A1* | 3/2015 | Borzycki | G06F 21/53 718/1 |
| 2015/0195302 A1* | 7/2015 | Ghosh | G06F 21/575 726/22 |

* cited by examiner

Primary Examiner — Fatoumata Traore
Assistant Examiner — Amie C Lin

(57) ABSTRACT

Aspects of the present invention include hypervisor based security using a hypervisor to monitor a VM. In embodiments of the present invention, the information gathered by the hypervisor in the monitoring is compared against a reference image to determine if there are possible rootkits present on the VM. If there are potential rootkits, the VM can be quarantined.

19 Claims, 7 Drawing Sheets

SYSTEM AND METHOD FOR HYPERVISOR-BASED SECURITY

BACKGROUND

Field of Invention

The present invention relates generally to virtual machines and more specifically to malware detection in virtual machines using a hypervisor.

Description of the Related Art

As the value and use of information continues to increase, individuals and businesses seek additional ways to process and store information. One option available to users is the use of virtual machines (VM). A VM is a software representation of a physical computer system.

One important feature in VMs is security and more specifically detection of viruses or rootkits. A rootkit is a malicious program that hides the presence of malware in the system by operating at the highest privilege level, which is where the operating system (OS) itself runs. Rootkits subvert the OS by intercepting and modifying low-level application programming interfaces (APIs) and system functions, thus hiding their presence and making it difficult to find or detect them.

Therefore, it is critical that these rootkits be identified before they work their way through the layers of the operating system, at which point detection would require special methods like behavioral-based analysis, signature scanning, difference scanning and memory dump analysis.

A kernel level rootkit may have characteristics of Direct Masquerades in that it can consist of malicious system calls pretending to be normal system calls. It may also have characteristics of Simple Masquerades in that it can masquerade as system calls that appear to something else that what they really are. Kernel level rootkits may be considered Environmental Masquerades in that they are already running and cannot be easily identified by computer users.

Detecting kernel modules is particularly difficult because a subverted or compromised OS cannot be trusted to find unauthorized modifications to itself.

Typically, virtual machines detect rootkits using an antivirus running on the guest machine. An antivirus relies on an OS to detect a rootkit. However, one problem with that system is that a rootkit can damage the OS, so relying on the OS to detect the rootkit is a problem with the current solutions. Rootkits can be particularly difficult to detect since they are designed to be hidden.

Since rootkits are often specifically designed to compromise the OS or to go undetected, it is often difficult to detect rootkits using the guest antivirus of the guest OS.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Embodiments of the present invention monitor the VM while it boots, locate anomalies in the boot process and validate the VM image. In some embodiments the hypervisor monitors the VM from different domains to obtain as much context information about the VM while it boots. In one embodiment the particular anomalies are rootkits.

In one embodiment the hypervisor can trace the anomalies generated by a rootkit while the rootkit tries to install itself into the system during the boot phase. The sequence of operations carried out by the rootkit during this phase would be characteristic of the rootkit and would not constitute as normal system operations of the VM. These differences in the sequence of operations during the boot phase could constitute anomalies that may or may not necessarily be malicious but can go a long way in sensing the presence of the rootkits before they cause harm.

A kernel-level rootkit can modify the kernel itself by modifying the interface between the user world and the kernel, parts of the core operating system and associated device drivers. The interface that allows the user world applications to communicate with the operating system is known as a system call. A kernel level rootkit can modify these system calls to perform malicious activity. These types of rootkits usually modify the system call table by inserting hooks in the place of default system call handlers. Kernel level rootkits are usually developed as loadable kernel modules in Linux or as device drivers in case of Windows®.

In one implementation a tool used for VM inspection is used. In this embodiment, probes, a tool in a hypervisor that allows dynamic code instrumentation of the guest VM, can be used. A hypervisor can be implemented in software, firmware and/or hardware. A computer running a hypervisor with at least one virtual machine running on it is referred to as a host machine. Each virtual machine is referred to as a guest VM. The hypervisor can act as the virtual operating platform for the guest operating systems. In a virtual machine, guest VMs can have different operating systems from each other and be hosted by the same host machine.

Figure 1:
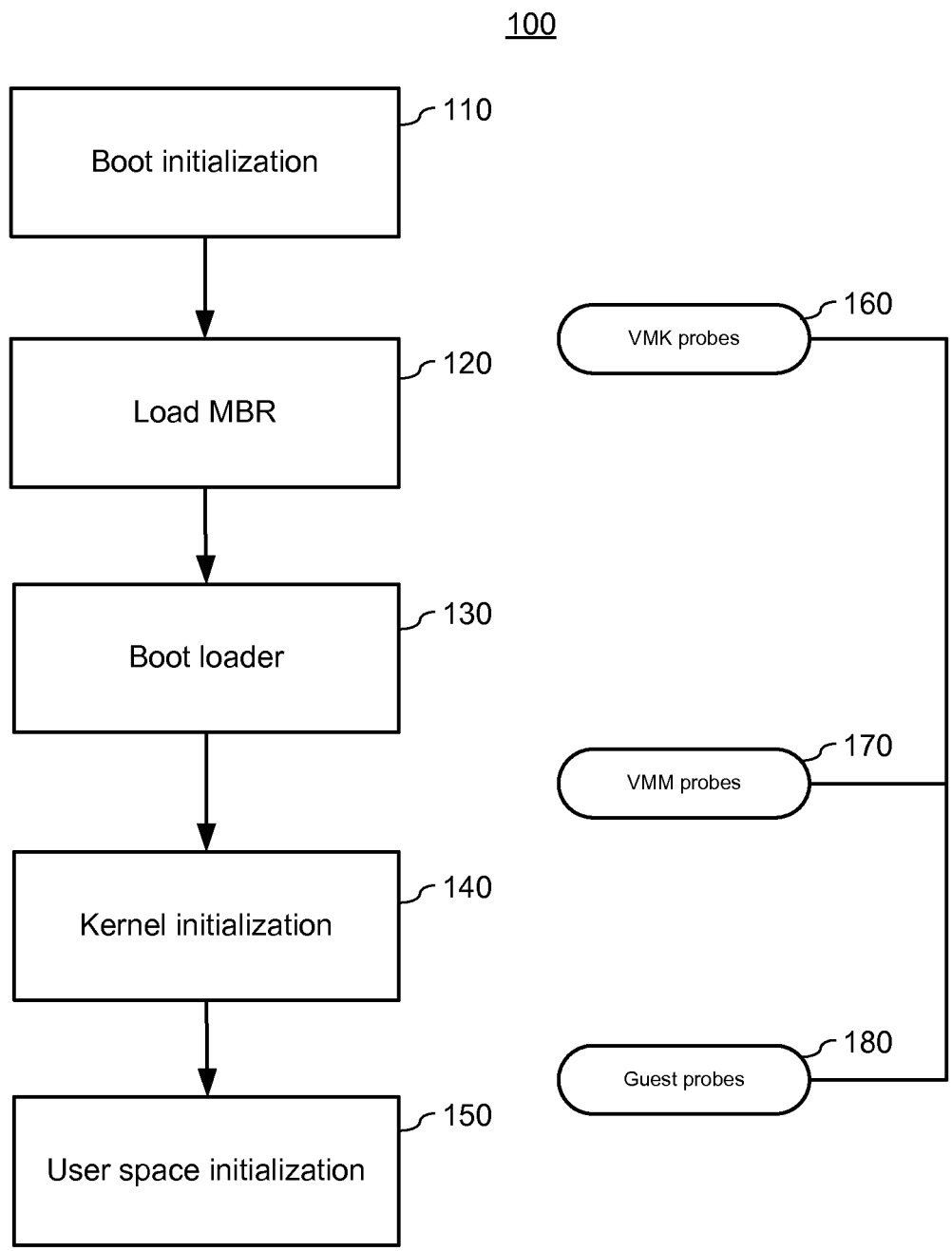
FIG. 1 depicts a block diagram of a boot sequence of a VM system according to embodiments of the present invention.

FIG. 1 shows the boot process and the various different types of probes that can be used. FIG. 1 shows boot initialization 110, load master boot record (MBR) 120, boot loader 130, kernel initialization 140, and user space defined 150. FIG. 1 also shows VMK probes 160, VMM probes 170, and guest probes 180. VMK probes 160 monitor the VM's external interactions. The VMK probes 160 intercept the interactions between the VM and the underlying physical resources. For example, the VMK probes 160 can intercept interactions related to disk access or virtual network interface (vNIC) events.

The VMM probes 170 obtains virtual central processing unit (vCPU) information. For example, the VMM probes 170 can obtain access to the vCPU registers to gain information related to guest faults or interrupts to the guest. The VMM probes 170 monitor contextual information regarding the virtual infrastructure on which the guest operates.

The guest probes 180 monitor guest internal activity. The guest probes 180 can be limited to activities occurring within the guest OS such as the system calls being executed. Each of these domains capture different types of events and vary in the level of guest context that is preserved.

Figure 2:
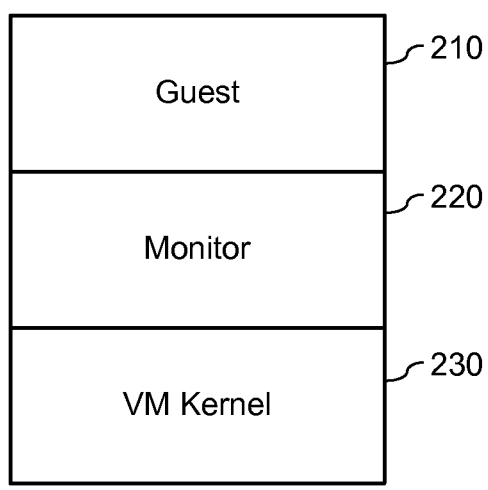
FIG. 2 depicts a block diagram of a VM according to embodiments of the present invention.

FIG. 2 depicts a block diagram of a VM according to embodiments of the present invention. FIG. 2 depicts VM 200 including VM monitor 220 and the portion of the VM running the guest 210 and VM kernel 230. The probes can monitor the VM across these three domains.

Figure 3:
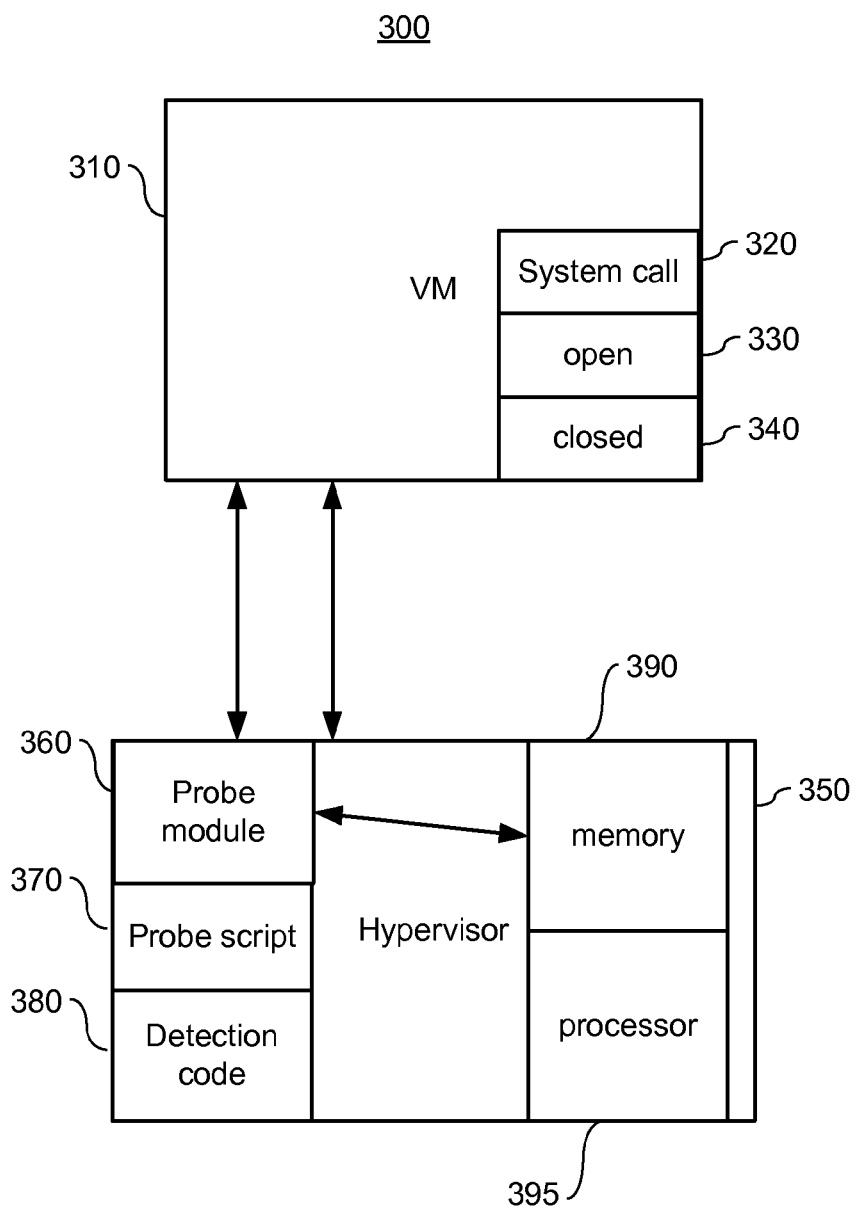
FIG. 3 depicts a block diagram of a hypervisor security system according to embodiments of the present invention.

FIG. 3 depicts a block diagram of a hypervisor security system 300 according to embodiments of the present invention. FIG. 3 depicts system 300 including VM 310 and hypervisor 350. VM 310 includes a system call (syscall) portion 320, and a closed portion 340 and an open portion 330. Hypervisor 350 comprises a probe module 360, a probe script 370, and detection code 380. Hypervisor 350 also comprises a memory 390 and a processor 395. Memory 390 can be any type of non-transitory memory. Processor 395 can be any type of processor used in a hypervisor.

VM 310 (the guest operating system) supports a list of system calls. Open 330 and closed 340 are two examples of systems calls. The system calls can be organized as a table of functions (referred to as a system call table). For example, when a file explorer running in a window Operating System (OS) tries to open a file, the application (file explorer) will invoke the "open" system call. The guest operating system is supposed to "service" this "open" system call. When hypervisor 350 is used, the hypervisor can intercept that "open" for disk access operation and interpret that open. For example hypervisor 350 can read the disk data controller, e.g., read a .vmdk file for the guest VM 210.

Probe module 360 can record/monitor all the hypervisor-guest OS interactions (not just disk access, but network, memory & CPU). The memory & CPU are also "done" by the hypervisor 350.

For example, if guest 210 wants to perform the operation "1+1", this operation requires getting the data from RAM/memory 390 (fetch the "1") to register. Then the CPU 395 operates on the values in the register. The memory 390 and registers are also virtualized (i.e. there are multiple RAM/register for each guest 210 in the hypervisor 350). As such, probe module 360 can be used to monitor those memory 390 and CPU 395 operations.

Hypervisor 350 is at a unique vantage point, which provides it much better visibility of the system than normal OS mechanisms both in terms of hardware and software events. Embodiments of the present invention can focus on the boot process specifically by studying the behavioral properties of the system in terms of the system calls executed and inspecting critical system data structures just after boot.

Hypervisor 350 provides the best of both worlds by providing strong guarantees of isolation and hence resistance to attack, unlike the guest OS, while also providing an authoritative view over each guest VM 310. By virtue of its position in the infrastructure, hypervisor 350 can control the access of each guest to the underlying hardware, while also being able to monitor software events in the guest VM 310. Embodiments of the present invention use this advantage of hypervisor 350 in order to provide security in a Software Defined Data Center (SDDC).

Hypervisor 350 can also use probe module 360. Probe module 360 is specifically designed to observe the main layers of a software stack: the guest operating system, the Virtual Machine Monitor (VMM), and the Virtual Machine Kernel (VMK). The tool makes it possible to collect various pieces of data at each layer, correlate events across these layers, or trace events from the guest all the way down to the hardware devices.

Using probe module 360, embodiments of the present invention can monitor virtual machine 310 or on the virtual infrastructure on which it runs. Probe module 360 is based on the concept of events and call back handlers. Probe module 360 can be placed at strategic points in the guest OS memory so as to notify hypervisor 350 about events occurring in the guest. Probe module 360 can be used to inspect VM 310 across domains for the guest, VMM and VMK domains.

Probe module 360, probe script 370, and detection code 380 all are coupled to the hypervisor 350 and specifically to VM 310. Probe module 360, probe script 370, and detection code 380 also save relevant data to the hypervisor 350 memory 390. Hypervisor 350, and specifically probe module 360, interacts with VM 310. Probe module 360 also embeds itself in into hypervisor 350. Probe module 360 intercepts calls made by VM 310 into hypervisor 350 and gets required information.

System behavior in the boot stage can be characterized in two distinct phases: Pre-OS phase and post-OS phase. The pre-OS phase comprises of the boot actions until the OS kernel is initialized. It consists of the initial hardware checks, loading the MBR/UEFI loader, loading the OS boot loader and then handing off control. The post-OS phase comprises of decompressing the kernel image, loading the initial random access memory (RAM) based file system, initializing the kernel, loading system drivers, launching the first user space init( ) process. Embodiments of the present invention operate in both the pre-OS phase and the post-OS phase.

Embodiments of the present invention can use probe module 360 to trap system calls. The OS has a list of system calls and the probes can monitor the list of system calls to make sure the system call addresses have not changed.

FIG. 3 shows the use of the hypervisor 350 to detect potential rootkits. That detection can be accomplished differently in different embodiments. For example, in one embodiment, hypervisor 350 can track system calls and introspect system call arguments. In another embodiment, hypervisor 350 detects potential rootkits by detecting kernel objects, such as drivers. Some viruses hide in the kernel modules. In another embodiment, hypervisor 350 can detect rootkits at boot up.

Some operating systems, for example Linux, generate a system call map that provides base addresses of a system call table. Malware or rootkits can change the system addresses. Embodiments of the present invention can set the probes prior to boot. When the machine starts up, the probes are activated.

In Linux virtual machines, for example, the system generates a system.map file, which enumerates all the symbols exported by the kernel and the address at which they can be found. This system.map file becomes part of a reference image, also referred to as a gold image. The reference image is created pre-boot based on a "clean" image of the machine. A "clean" image of the machine is an image that is trusted or known not to contain rootkits or any other virus or malware. Hypervisor 350 can use the reference image to validate the VM image.

After the system is booted, hypervisor 350 can access the address at which it expects the system call table to start and traverse the data structure to determine the base addresses of the default handlers. Then hypervisor 350 can then compare these default handlers with the expected addresses from the reference image, and more particularly, the system.map file. By comparing the addresses the hypervisor 350 can determine whether there are unexpected hooks in the system call table. These hooks can represent an anomaly and a potential rootkit.

In one embodiment, probe script 370 is a probe specific script, similar to a debugger. Probe module 360 monitors VM 310 memory based on probe script 370 and saves information intercepted from VM 310 in hypervisor 350 memory 390. Probe module 360 can also send a trigger back to the hypervisor 350. The probe script has access to the system call table as well as memory addresses and offsets. Addresses modified by malware are often outside the kernel space.

Critical sections from the reference image that are required for malware/rootkit detection are stored in hypervisor 350, e.g., system.map. Alternatively, the critical sections from the reference image can be stored outside of hypervisor 350. The reference image is the image of the machine as it was first shipped from the store. Detection code 380, running on processor 395, compares the new values reported back from probe modules 360 to the reference image. In a data center, the system call table is not likely to change.

In one embodiment, a kernel module is loaded. The system call is loaded with the default system call handler at an address known by probe module 360. System call handler 320 in VM 310 can be used. Probe module 360 monitors the system call handler 320 in both open 330 and closed 340 system calls. Hypervisor 350 compares the system call handler addresses to a reference image to determine whether there are anomalies that are potential rootkits.

In one embodiment a boot sequence can be compared against a reference image for a boot sequence. A hypercall is a command used for a guest to request action or information from the hypervisor. A hypercall is used whenever a VM needs to do something only visible by the hypervisor, for example, shut down or read/write to a particular location (since the VM doesn't have a disk). The hypervisor presents the VM with the illusion that it has its own hardware since the hypervisor owns the hardware.

Probe module 360 can also monitor hypercalls. Hypervisor 350 can build a signature during a boot sequence. Each boot signature should be similar between boots so the hypercall sequence should be similar between boots. Again, probe module 360 monitors the hypercalls in the boot sequence. The boot hypercalls can be compared against a reference image in the hypervisor 350.

Figure 4:
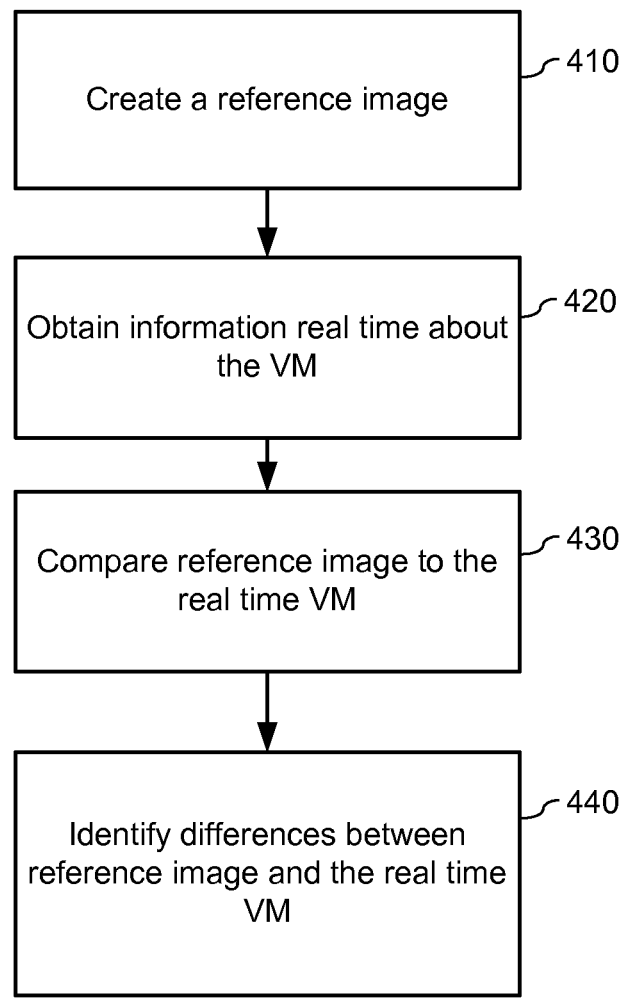
FIG. 4 depicts a flowchart of a hypervisor security method according to embodiments of the present invention.

FIG. 4 depicts a flowchart of a hypervisor security method 400 according to embodiments of the present invention. FIG. 4 shows creating a reference image 410, obtaining information real time about the VM 420, comparing the reference image to the real time VM 430, and identifying differences between the reference image and the real time VM 440.

The information about the real time VM is gathered by the probes in the hypervisor and stored in memory in the hypervisor 420. The comparison of the real time VM and the reference image 430 is done in the hypervisor based on information about real time VM obtained by the probes. The hypervisor identifies differences between the real time VM and the reference image 440. These differences are identified as potential threats and tagged and quarantined, as described with respect to FIG. 7.

Figure 5:
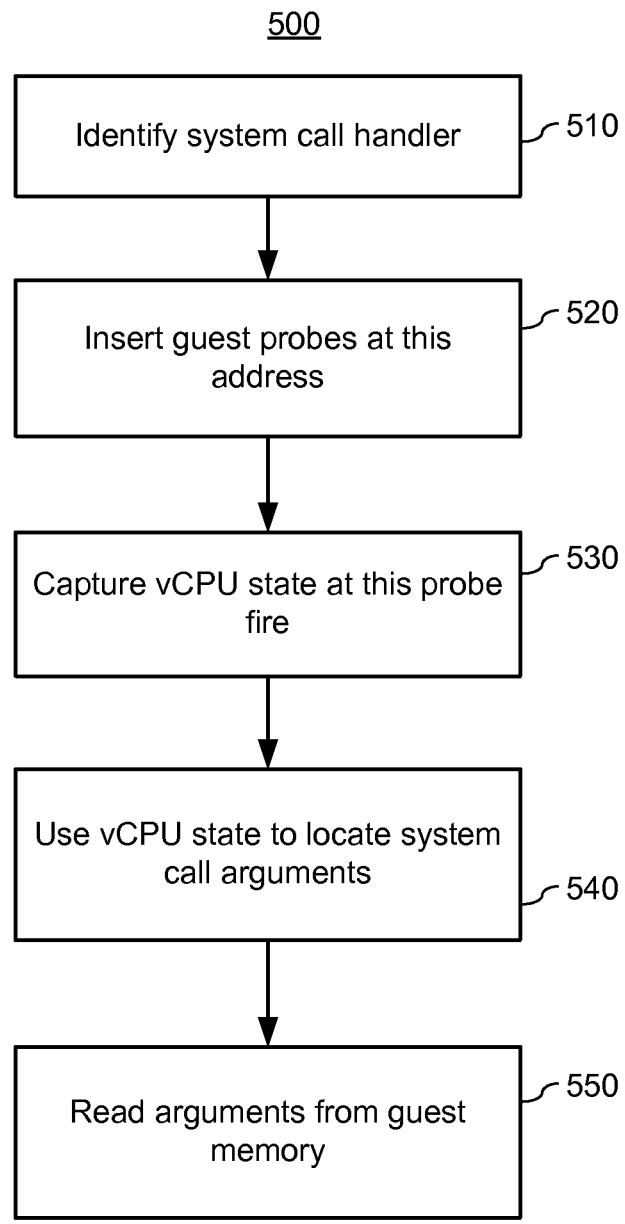
FIG. 5 depicts a flowchart for capturing system calls according to embodiments of the present invention.

FIG. 5 depicts a flowchart for capturing system calls according to embodiments of the present invention. FIG. 5 illustrates the process 500 used by the probe module to capture the system call information, which provides more detail to one embodiment of the obtain information about the real time VM 420 described in reference to FIG. 4.

To capture guest information during the post-OS phase embodiments of the present invention use guest probes. These probes are fired in the context of a vCPU thread and preserve context information about the guest's virtual CPU state.

FIG. 5 shows, identifying a system call handler 510, inserting a guest probe at that address 520. This probe is fired every time control enters this address in the guest. When this probe is fired, the current register values and vCPU state are captured. The contents of the registers can be used to determine the system call number and the path to arguments for each system call 540. The arguments can be read from the guest linear memory 550. For example one of the arguments of the open( ) system call, indicates what file is being opened. The system call number is obtained from a register and that indicates which system call is being invoked. This data can be compared against the trusted actual data and thereby determine if the syscall table has been tampered.

Figure 6:
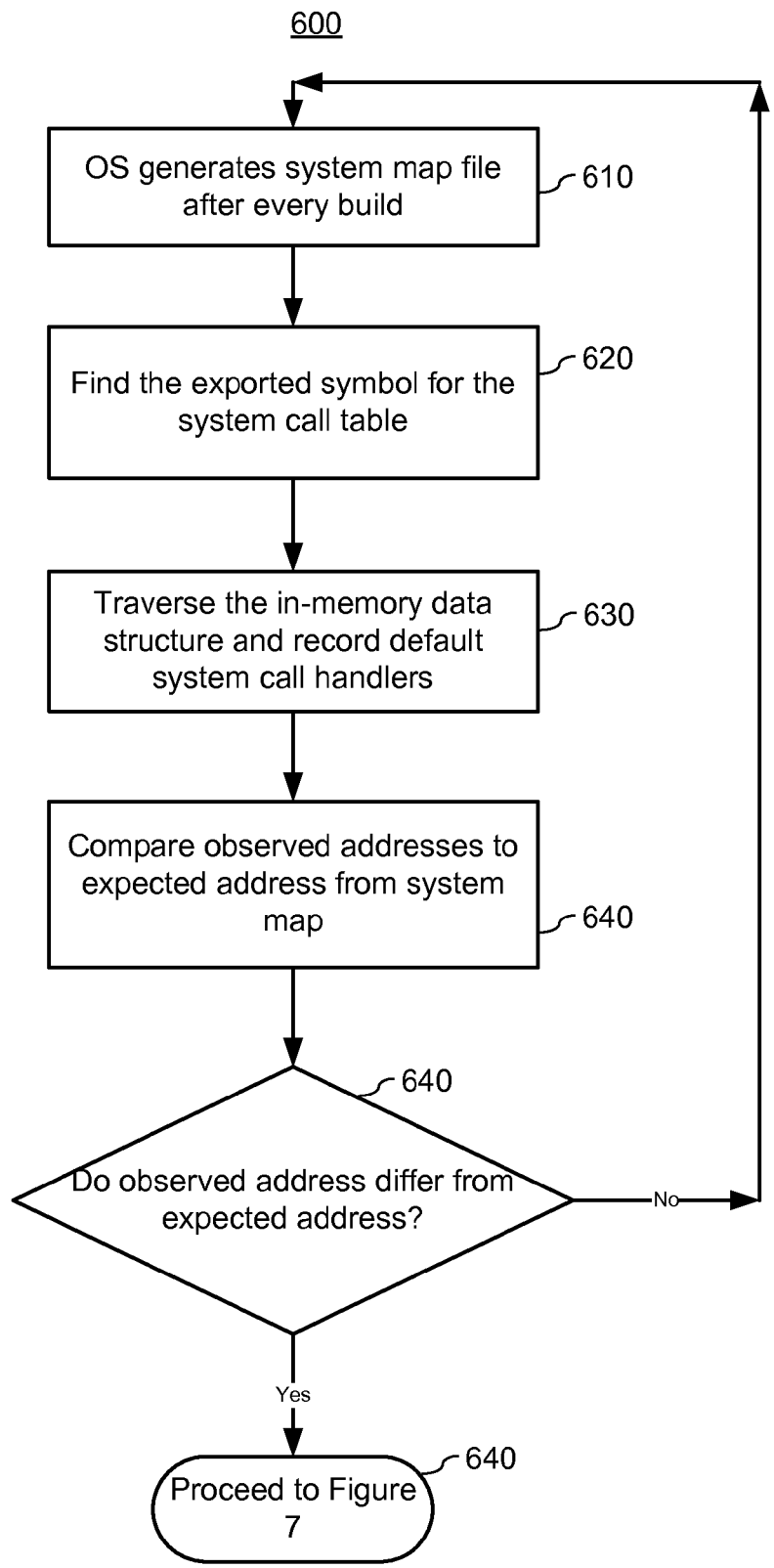
FIG. 6 depicts a flowchart for tracing system call table for hooks according to embodiments of the present invention.

FIG. 6 depicts a flowchart for tracing a system call table for hooks according to embodiments of the present invention. Rootkits are frequently loaded into the operating system as device drivers in the example of a Windows® based operating system or kernel objects in the example of a Linux operating system. Thus, in one embodiment, the VM can be validated by comparing new drivers or kernel modules loaded during boot.

As described above, a reference image of allowed or safe drivers or kernel modules can be determined. During each boot of the VM, the probes can track all the drivers and kernel objects being loaded and verify them against the reference list. Any new kernel module or driver that does not belong to the reference list can be tagged and marked for validation. FIG. 6 illustrates the flow for creating a reference image 410 as described in reference to FIG. 4.

FIG. 6 shows the OS generating a system map file after every build 610, finding the exported symbol for the system call table 620, traversing the in-memory data structure and record default system handlers 630, and comparing the observed addresses to the expected address from the system map 640.

To track all kernel modules being loaded, the hypervisor can look at all occurrences of the open system call and the associated arguments. Regardless of how the malware is designed or installed, the object file must be opened in order to load the module or even copy its contents to another safe driver. The installation of every kernel module or driver involves a certain set of system calls, of which open system call was always one. In one embodiment, the arguments of the open system call are used in order to capture a superset of possible anomalies. Monitoring the open system calls is useful because some malicious rootkits, for example TDL3/4, do not load themselves as separate modules but instead rewrite legitimate kernel drivers. Trapping all open system calls identifies such anomalous behavior.

Figure 7:
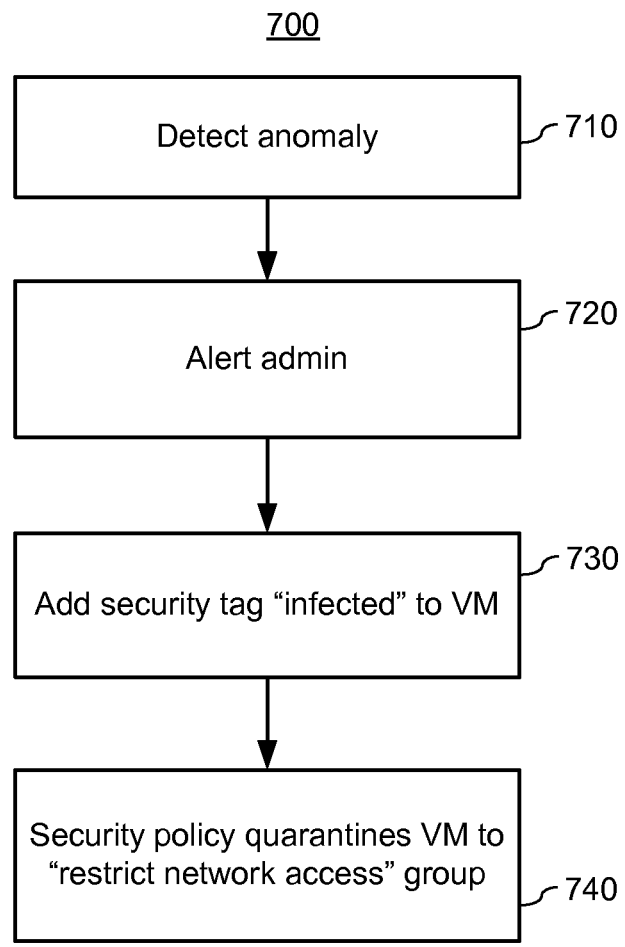
FIG. 7 depicts a flowchart for anomaly detection according to embodiments of the present invention.

FIG. 7 depicts a flowchart for anomaly detection according to embodiments of the present invention. FIG. 7 shows the process for handling a possible rootkit once it has been identified. FIG. 7 shows detecting an anomaly (or possible rootkit) 710. In one embodiment, if an anomaly is detected, the guest VM can be allowed to boot without any interruptions but the administrator is alerted 720 regarding the anomalies observed during boot. The anomalous VM is tagged with a suitable security tag 730 and a security policy can quarantine the VM to a security group that has restricted access 740. For example, a vulnerable VM can be tagged with the "Infected" security tag and quarantined to the security group "Restrict Network Access," which would prevent the VM from any form of network activity.

An advantage of the present invention is that rootkits and other malware can be detected since the present invention does not rely on the OS, which is often compromised by the rootkit itself, to detect the rootkits.

Another benefit is that there is no requirement of any component to be installed on the VM itself. Agentless detection makes this architecture very easy to use.

Various benefits are available as a result of the present invention. One such benefit is that embodiments of the present invention detect the presence of rootkits and quarantines the potentially infected VMs.

Another benefit is that embodiments of the present invention rootkits can be detected either as they are installed or at boot up of a VM.

Embodiments of the present invention provide rootkit detection using tools available in the hypervisor. Thus, the rootkits can be detected and quarantined immediately. The hypervisor has the ability to perform essentially continuous monitoring of the VM and compare it to a reference image to detect a possible rootkit.

Aspects of the present invention may be encoded upon one or more non-transitory computer-readable media with instructions for one or more processors or processing units to cause steps to be performed. One or more non-transitory computer-readable media shall include volatile and non-volatile memory. Alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

In the above description, for purposes of explanation, specific examples and details are set forth in order to provide an understanding of the invention. However, the invention may be practiced without these details. Well known process steps may not be described in detail in order to avoid unnecessarily obscuring the present invention. Other applications are possible, such that the above examples should not be taken as limiting. Furthermore, aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. The terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. Furthermore, methods or algorithms steps may not be limited to the specific order set forth herein; rather, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to detect rootkits or other malware. The terms rootkit, malware, virus, etc. are used interchangeably herein to refer to any potentially malicious program installed for the purpose of obtaining access or information to a machine.

What is claimed is:

1. A rootkit detection system to detect a rootkit in a virtual machine, comprising:
 a hypervisor comprising a non-transitory memory for storing a reference image and a processor, wherein the reference image represents a clean image of the virtual machine;

a probe module running on the hypervisor for monitoring the virtual machine and gathering information about the virtual machine, wherein gathering information includes using one or more probes to obtain information about calls made by the virtual machine, and wherein the gathered information comprises a list of system call addresses in a system call table;

a probe script running on the hypervisor that uses the probe module to access and store the gathered information related to the virtual machine on the memory in the hypervisor; and a detection code running on the hypervisor that performs a comparison between the reference image and the gathered information about the virtual machine, wherein the comparing includes comparing the obtained call information to call information of the reference image including determining whether one or more system call addresses are changed relative to information of the reference image.

2. The rootkit detection system of claim 1 wherein the code probe module further comprises an alert mechanism for alerting an administrator about a potential malware on the virtual machine.

3. The rootkit detection system of claim 1 wherein the probe module continuously monitors the virtual machine.

4. The rootkit detection system of claim 1 wherein the reference image is stored outside of the hypervisor.

5. The rootkit detection system of claim 1 wherein the reference image comprises a list of addresses in a system call table.

6. The rootkit detection system of claim 1 wherein the gathered information from the virtual machine comprises a location of a system call handler, the gathering information including using the probe module to insert a guest probe at the address of the system call handler, wherein the guest probe captures current register values and virtual CPU state.

7. The rootkit detection system of claim 1 wherein the reference image comprises a location of a system call handler.

8. The rootkit detection system of claim 1 wherein the gathered information from the virtual machine comprises a sequence of hypercalls.

9. The rootkit detection system of claim 1 wherein a portion of the reference image comprises a sequence of hypercalls during a boot sequence of the virtual machine.

10. A method for rootkit detection in a virtual machine, comprising:
storing, by a hypervisor, a portion of a reference image of a virtual machine, wherein the reference image represents a clean image of the virtual machine;
monitoring, by the hypervisor, information from a virtual machine, wherein monitoring includes using one or more probes to obtain information about calls made by the virtual machine, and wherein the monitored information comprises a list of system call addresses in a system call table;
accessing and storing, by the hypervisor, the monitored information related to the virtual machine on a memory in the hypervisor;
comparing, by the hypervisor, the monitored information from the virtual machine to the reference image to determine whether there are one or more differences between the monitored information from the virtual machine and the reference image, wherein the comparing includes comparing the obtained call information to call information of the reference image including determining whether one or more system call addresses are changed relative to information of the reference image; and
determining, by the hypervisor, an action in response to determining that there are one or more differences.

11. The method of claim 10 wherein the information monitored is a location of a system call handler, the monitoring including inserting a guest probe at the address of the system call handler, wherein the guest probe captures current register values and virtual CPU state.

12. The method of claim 10 wherein the information monitored is a sequence of hypercalls during a boot sequence of the virtual machine.

13. The method of claim 10 wherein the action comprises alerting an administrator about the difference between the information gathered from the virtual machine and the portion of the reference image.

14. The method of claim 10 wherein the action comprises quarantining the virtual machine with the difference from the reference image.

15. The method of claim 10, wherein the comparing comprises comparing information about new drivers or kernel modules loaded during boot to allowed drivers or kernel modules of the reference image.

16. The method of claim 15, wherein monitoring information about kernel modules being loaded includes monitoring occurrences of open system calls and associated arguments.

17. A non-transitory computer-readable medium or media comprising one or more sequences of instructions which, when executed by one or more processors, causes steps for detection of a rootkit on a virtual machine, comprising:
storing, by a hypervisor, a portion of a reference image of a virtual machine, wherein the reference image represents a clean image of the virtual machine;
monitoring, by the hypervisor, information from a virtual machine, wherein monitoring includes using one or more probes to obtain information about calls made by the virtual machine and wherein the monitored information comprises a list of system call addresses in a system call table;
accessing and storing, by the hypervisor, the monitored information related to the virtual machine on a memory in the hypervisor;
comparing, by the hypervisor, the monitored information from the virtual machine to the portion of the reference image to determine whether there are one or more differences between the monitored information from the virtual machine and the reference image, wherein the comparing includes comparing the obtained call information to call information of the reference image including determining whether one or more system call addresses are changed relative to information of the reference image; and
determining, by the hypervisor, an action in response to determining that there are one or more differences.

18. The non-transitory computer readable medium or media of claim 17 wherein the action comprises alerting an administrator about the difference between the information monitored from the virtual machine and the reference image.

19. The non-transitory computer readable medium or media of claim 17 wherein the action comprises quarantining the virtual machine with the difference from the reference image.

* * * * *